United States Patent
Kleve et al.

(10) Patent No.: US 10,075,806 B2
(45) Date of Patent: Sep. 11, 2018

(54) WIRELESS VEHICLE TRACKING

(75) Inventors: Robert Bruce Kleve, Farmington, MI (US); John Robert Van Wiemeersch, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1147 days.

(21) Appl. No.: 12/727,462

(22) Filed: Mar. 19, 2010

(65) Prior Publication Data

US 2011/0230165 A1    Sep. 22, 2011

(51) Int. Cl.
| | |
|---|---|
| *H04W 4/02* | (2018.01) |
| *B60R 25/102* | (2013.01) |
| *G01S 5/00* | (2006.01) |
| *G08G 1/00* | (2006.01) |
| *H04W 24/00* | (2009.01) |
| *H04W 60/06* | (2009.01) |
| *H04W 64/00* | (2009.01) |

(52) U.S. Cl.
CPC ............ *H04W 4/02* (2013.01); *B60R 25/102* (2013.01); *G01S 5/0027* (2013.01); *G08G 1/205* (2013.01); *H04W 24/00* (2013.01); *H04W 60/06* (2013.01); *H04W 64/00* (2013.01)

(58) Field of Classification Search
CPC ..... H04W 4/021; H04W 4/046; H04W 12/06; G08G 1/20; G08G 1/205; G08G 1/207; G08G 1/127; G06Q 10/0833; G08B 25/10
USPC ................. 455/456.2; 340/540, 686.1, 686.6
See application file for complete search history.

(56) References Cited

U.S. PATENT DOCUMENTS

| | | | |
|---|---|---|---|
| 4,804,937 A | 2/1989 | Barbiaux | |
| 5,355,511 A | 10/1994 | Hatano et al. | |
| 5,432,841 A * | 7/1995 | Rimer | 455/457 |
| 5,654,686 A | 8/1997 | Geschke et al. | |

(Continued)

FOREIGN PATENT DOCUMENTS

| | | |
|---|---|---|
| DE | 10225787 A1 | 12/2003 |
| WO | 2009062765 A2 | 5/2009 |

OTHER PUBLICATIONS

J. Smith, Wanted: One Gorilla, printed from www.tirereview.com, Jul. 27, 2009.

(Continued)

*Primary Examiner* — Mrunalini Yerneni Mummalaneni
(74) *Attorney, Agent, or Firm* — Jennifer Stec; Brooks Kushman P.C.

(57) ABSTRACT

A vehicle tracking system includes a remote portable wireless device. The system also includes a wireless transceiving device included in each of a plurality of vehicles, the wireless transceiving device in communication with a GPS device. The system further includes a server, capable of communicating with both the remote portable wireless device and each wireless transceiving device. The at least one server may receive a plurality of vehicle selections from the remote portable wireless device. The server may also determine a vehicle that corresponds to each of the plurality of selections, including a cellular phone number for each determined vehicle. The server may further transmit tracking instructions to each determined vehicle and receive GPS coordinates from each vehicle. The server may compare the received coordinates from each vehicle and report a deviance beyond a predetermined threshold to the remote portable wireless device.

8 Claims, 9 Drawing Sheets

(56) References Cited

U.S. PATENT DOCUMENTS

| | | | |
|---|---|---|---|
| 5,732,074 A | 3/1998 | Spaur et al. | |
| 5,758,300 A | 5/1998 | Abe | |
| 5,889,468 A | 4/1999 | Banga | |
| 5,942,979 A | 8/1999 | Luppino | |
| 5,943,206 A | 8/1999 | Crayford | |
| 5,963,129 A | 10/1999 | Warner | |
| 5,986,543 A | 11/1999 | Johnson | |
| 5,993,397 A | 11/1999 | Branson | |
| 6,025,777 A | 2/2000 | Fuller et al. | |
| 6,037,676 A | 3/2000 | Foree | |
| 6,067,009 A | 5/2000 | Hozuka et al. | |
| 6,104,931 A * | 8/2000 | Havinis et al. | 455/456.5 |
| 6,292,095 B1 | 9/2001 | Fuller et al. | |
| 6,295,449 B1 | 9/2001 | Westerlage et al. | |
| 6,339,736 B1 | 1/2002 | Moskowitz et al. | |
| 6,343,220 B1 | 1/2002 | Van Der Salm | |
| 6,370,472 B1 | 4/2002 | Fosseen | |
| 6,415,210 B2 | 7/2002 | Hozuka et al. | |
| 6,429,773 B1 | 8/2002 | Schuyler | |
| 6,435,018 B1 | 8/2002 | Murakami et al. | |
| 6,441,732 B1 | 8/2002 | Laitsaari et al. | |
| 6,470,732 B1 | 10/2002 | Breton | |
| 6,487,478 B1 | 11/2002 | Azzaro et al. | |
| 6,525,643 B1 | 2/2003 | Okada et al. | |
| 6,529,136 B2 * | 3/2003 | Cao et al. | 340/686.1 |
| 6,571,617 B2 | 6/2003 | Van Niekerk et al. | |
| 6,587,040 B2 | 7/2003 | Seto | |
| 6,611,740 B2 | 8/2003 | Lowrey et al. | |
| 6,612,165 B2 | 9/2003 | Juzswik et al. | |
| 6,629,031 B2 | 9/2003 | Gustavsson et al. | |
| 6,671,609 B2 | 12/2003 | Nantz et al. | |
| 6,691,025 B2 | 2/2004 | Reimer | |
| 6,732,031 B1 | 5/2004 | Lightner et al. | |
| 6,738,697 B2 | 5/2004 | Breed | |
| 6,825,758 B1 | 11/2004 | Laitsaari | |
| 6,832,708 B2 | 12/2004 | Tripathi | |
| 6,839,614 B1 | 1/2005 | Timko et al. | |
| 6,845,314 B2 | 1/2005 | Fosseen | |
| 6,847,872 B2 | 1/2005 | Bodin et al. | |
| 6,853,853 B1 | 2/2005 | Van Wiemeersch et al. | |
| 6,868,358 B2 | 3/2005 | Brown, Jr. | |
| 6,892,052 B2 | 5/2005 | Kotola et al. | |
| 6,930,614 B2 | 8/2005 | Rackham et al. | |
| 6,937,141 B2 | 8/2005 | Muramatsu | |
| 6,983,200 B2 | 1/2006 | Bodin et al. | |
| 6,993,421 B2 | 1/2006 | Pillar et al. | |
| 7,053,761 B2 | 5/2006 | Schofield et al. | |
| 7,068,158 B2 | 6/2006 | Komatsu et al. | |
| 7,092,804 B2 | 8/2006 | McQuade et al. | |
| 7,096,101 B2 | 8/2006 | Sonnenrein et al. | |
| 7,114,379 B2 | 10/2006 | Emord | |
| 7,171,188 B1 | 1/2007 | Watanabe et al. | |
| 7,216,532 B2 | 5/2007 | Rimkus et al. | |
| 7,218,209 B2 | 5/2007 | Utter et al. | |
| 7,219,063 B2 | 5/2007 | Schalk et al. | |
| 7,224,262 B2 | 5/2007 | Simon et al. | |
| 7,228,122 B2 | 6/2007 | Oyagi et al. | |
| 7,319,378 B1 | 1/2008 | Thompson et al. | |
| 7,327,250 B2 * | 2/2008 | Harvey | B60R 25/1012 340/425.5 |
| 7,379,541 B2 | 5/2008 | Iggulden et al. | |
| 7,394,352 B2 | 7/2008 | Bell et al. | |
| 7,509,849 B2 | 3/2009 | Rutherford et al. | |
| 7,778,186 B2 | 8/2010 | Oman et al. | |
| 7,783,246 B2 | 8/2010 | Twitchell, Jr. et al. | |
| 7,849,149 B2 | 12/2010 | Habaguchi et al. | |
| 7,859,392 B2 * | 12/2010 | McClellan et al. | 340/441 |
| 8,061,879 B2 | 11/2011 | Simmons et al. | |
| 8,089,348 B2 | 1/2012 | Kameyama | |
| 8,120,475 B2 | 2/2012 | Iwamoto et al. | |
| 8,217,777 B2 | 7/2012 | Sekiyama et al. | |
| 8,325,028 B2 | 12/2012 | Schofield et al. | |
| 2001/0033225 A1 | 10/2001 | Razavi et al. | |
| 2002/0130771 A1 | 9/2002 | Osborne et al. | |
| 2003/0004741 A1 | 1/2003 | Johnson et al. | |
| 2003/0016130 A1 | 1/2003 | Joao | |
| 2003/0093218 A1 * | 5/2003 | Jones | 701/201 |
| 2003/0158640 A1 | 8/2003 | Pillar et al. | |
| 2003/0205081 A1 | 11/2003 | Proschka | |
| 2003/0208309 A1 | 11/2003 | Triphathi | |
| 2004/0050188 A1 | 3/2004 | Richards et al. | |
| 2004/0075539 A1 | 4/2004 | Savoie et al. | |
| 2004/0112124 A1 | 6/2004 | Sonnenrein et al. | |
| 2004/0193368 A1 * | 9/2004 | Sanqunetti | 701/207 |
| 2005/0024189 A1 | 2/2005 | Weber | |
| 2005/0137763 A1 | 6/2005 | Watkins et al. | |
| 2005/0159883 A1 * | 7/2005 | Humphries et al. | 701/207 |
| 2005/0179518 A1 | 8/2005 | Kawamura et al. | |
| 2005/0195106 A1 | 9/2005 | Davis et al. | |
| 2005/0273218 A1 | 12/2005 | Breed et al. | |
| 2006/0095174 A1 | 5/2006 | Sonnenrein et al. | |
| 2006/0208865 A1 | 9/2006 | Quach et al. | |
| 2006/0220806 A1 | 10/2006 | Nguyen | |
| 2006/0220809 A1 | 10/2006 | Stigall et al. | |
| 2006/0220813 A1 | 10/2006 | Utter et al. | |
| 2006/0235652 A1 | 10/2006 | Rimkus et al. | |
| 2006/0273885 A1 | 12/2006 | Thompson | |
| 2006/0288101 A1 | 12/2006 | Mastrodonato et al. | |
| 2007/0015548 A1 * | 1/2007 | Flick | 455/569.2 |
| 2007/0060056 A1 | 3/2007 | Whitaker et al. | |
| 2007/0155300 A1 | 7/2007 | Hsieh | |
| 2007/0156317 A1 | 7/2007 | Breed | |
| 2007/0193348 A1 | 8/2007 | Rutherford et al. | |
| 2007/0200671 A1 | 8/2007 | Kelley et al. | |
| 2007/0229350 A1 * | 10/2007 | Scalisi | H04L 67/26 342/350 |
| 2007/0290881 A1 | 12/2007 | Nikitin et al. | |
| 2008/0046149 A1 | 2/2008 | Breed | |
| 2008/0077292 A1 | 3/2008 | Gisler | |
| 2008/0082221 A1 | 4/2008 | Nagy | |
| 2008/0084333 A1 * | 4/2008 | Forrest et al. | 340/989 |
| 2008/0106859 A1 | 5/2008 | Eguchi et al. | |
| 2008/0125665 A1 | 5/2008 | Nigam | |
| 2008/0136611 A1 | 6/2008 | Benco et al. | |
| 2008/0140265 A1 | 6/2008 | Hong et al. | |
| 2008/0147265 A1 | 6/2008 | Breed | |
| 2008/0147271 A1 | 6/2008 | Breed | |
| 2008/0197970 A1 | 8/2008 | Fouts | |
| 2008/0204556 A1 | 8/2008 | de Miranda et al. | |
| 2008/0215665 A1 | 9/2008 | Appleby et al. | |
| 2008/0228355 A1 | 9/2008 | de Jonk et al. | |
| 2008/0231446 A1 * | 9/2008 | Cresto | 340/572.1 |
| 2008/0266051 A1 | 10/2008 | Taki et al. | |
| 2008/0299961 A1 | 12/2008 | Muller et al. | |
| 2008/0309451 A1 | 12/2008 | Zellweger et al. | |
| 2009/0075624 A1 | 3/2009 | Cox et al. | |
| 2009/0091437 A1 | 4/2009 | Corniot | |
| 2009/0091439 A1 | 4/2009 | Sekiyama et al. | |
| 2009/0096575 A1 | 4/2009 | Tieman | |
| 2009/0096576 A1 | 4/2009 | Oman et al. | |
| 2009/0096596 A1 | 4/2009 | Sultan et al. | |
| 2009/0098907 A1 | 4/2009 | Huntzicker et al. | |
| 2009/0167524 A1 | 7/2009 | Chesnutt et al. | |
| 2009/0273438 A1 | 11/2009 | Sultan et al. | |
| 2009/0298513 A1 * | 12/2009 | Hampel | H04W 4/02 455/456.1 |
| 2009/0309709 A1 * | 12/2009 | Bevacqua et al. | 340/426.18 |
| 2010/0145759 A1 | 6/2010 | Hembury | |
| 2010/0168967 A1 | 7/2010 | Dlugoss et al. | |
| 2010/0233957 A1 | 9/2010 | Dobosz | |
| 2011/0015971 A1 | 1/2011 | Hembury | |
| 2011/0071720 A1 | 3/2011 | Schondorf et al. | |
| 2011/0071725 A1 | 3/2011 | Kleve et al. | |
| 2011/0071734 A1 | 3/2011 | Van Wiemeersch et al. | |
| 2011/0080282 A1 | 4/2011 | Kleve et al. | |
| 2011/0130945 A1 | 6/2011 | Deedy et al. | |
| 2011/0205040 A1 | 8/2011 | Van Wiemeersch et al. | |
| 2011/0205047 A1 | 8/2011 | Patel et al. | |

(56) References Cited

U.S. PATENT DOCUMENTS

2011/0215901 A1 9/2011 Van Wiemeersch et al.
2011/0230165 A1 9/2011 Kleve et al.

OTHER PUBLICATIONS

Check Tire Pressure with Bluetooth, printed from www.esato.com, Jul. 30, 2004.
Acumine Pty Ltd—Fleet Monitoring System, http://www.acumine.com/_Products/Fleet Monitoring.php., May 22, 2009.
Vehicle monitoring system, GPS vehicle monitoring system. Vehicle tracking system. http://www.guardmagic.com/, May 22, 2009.
911 Assist, Vehicle Health Report Expand Sync Capabilities and Convenience Features, printout from www.media.ford.com.
Vehicle Health Report Delivers Assistance With Vehicle Maintenance and Monitoring, printout from www.media.ford.com.
Solindo GPS, Solindo Web Products: The Solutions Provider Company. Printout from www.solindoweb.com/products.php on Sep. 16, 2009, pp. 1-4.
Chinese Patent Office, First Office Action for the corresponding Chinese Patent Application No. 201110052766.0 dated Feb. 13, 2014.

* cited by examiner

WIRELESS VEHICLE TRACKING

TECHNICAL FIELD

The illustrative embodiments relate to wireless vehicle tracking.

BACKGROUND

With advances in GPS and wireless technology, it is becoming increasingly possible to accurately track and update a vehicle location using a wireless device. Wireless device displays have advanced to provide full color interactive information. GPS technology also allows tracking of a vehicle within feet of its present location for a very reasonable cost.

Further, GPS systems have been developed that allow the broadcasting of a GPS signal, to, for example, a computer, such as a police computer, that allow a police station to track a stolen vehicle. An onboard or other GPS located in a vehicle can, when so instructed (such as by the activation of a vehicle alarm) send a signal to a remote computer that allows the vehicle to be tracked. 2007/0099626 Another existing solution to vehicle tracking includes a cellular unit that has built therein a GPS device. When a call is placed to the cellular unit, with proper authentication information, the cellular unit queries the GPS device included therein and responds to the call with present GPS information of the cellular unit.

Additionally, advanced cellular devices, such as an IPHONE or a BLACKBERRY may have touch sensitive displays capable of displaying much more than a simple string of character information.

SUMMARY

In one illustrative embodiment, a method of tracking a plurality of vehicles includes selecting each of a plurality of vehicles for tracking. The method also includes transmitting information, including at least a selection designation, to an intermediary server.

In this illustrative embodiment, the method further includes correlating the selection designation of each vehicle with a corresponding vehicle, including identifying a cellular phone number associated with each vehicle. The method also includes communicating with each vehicle over a cellular network using the identified corresponding cellular phone for communication with each vehicle.

The method further includes transmitting a tracking request to each vehicle and receiving a coordinate set from a cellular transmitter included in each vehicle, at intervals. Finally, the method includes comparing the plurality of coordinate sets and sending a message to a remote device if there is a deviance beyond a predetermined threshold between any of the plurality of coordinate sets.

In a second illustrative embodiment, a computer readable storage medium stores a plurality of instructions executable by a microprocessor. Execution of the instructions by the microprocessor causes the microprocessor to perform the steps including receiving a plurality of selection designations of vehicles. The processor is also caused to correlate the selection designation of each vehicle with a corresponding vehicle, including identifying a cellular phone number associated with each vehicle.

Execution of the instructions also causes the microprocessor to communicate with each vehicle over a cellular network using the identified corresponding cellular phone for communication with each vehicle.

The microprocessor is further caused to transmit a tracking request to each vehicle and receive coordinates from a cellular transmitter included in each vehicle, at intervals.

Finally, the microprocessor is caused to compare the plurality of coordinate sets and send a message to a remote device if there is a deviance beyond a predetermined threshold between any of the plurality of coordinate sets.

In still a third illustrative embodiment, a vehicle tracking system includes at least one remote portable wireless device for tracking vehicles. The system also includes at least one wireless transceiving device included in each of a plurality of vehicles, the wireless transceiving device in communication with a GPS device. The system further includes at least one server, capable of communicating with both the remote portable wireless device and each wireless transceiving device through a cellular network.

In this illustrative embodiment, the server may receive a plurality of vehicle selections from the remote portable wireless device and determine a vehicle that corresponds to each of the plurality of selections, including a cellular phone number for each determined vehicle. The server may further transmit, over a cellular network, tracking instructions to each determined vehicle and receive, over the cellular network, GPS coordinates from each vehicle.

The server may also compare the received coordinates from each vehicle and report a deviance beyond a predetermined threshold to the remote portable wireless device.

DETAILED DESCRIPTION

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
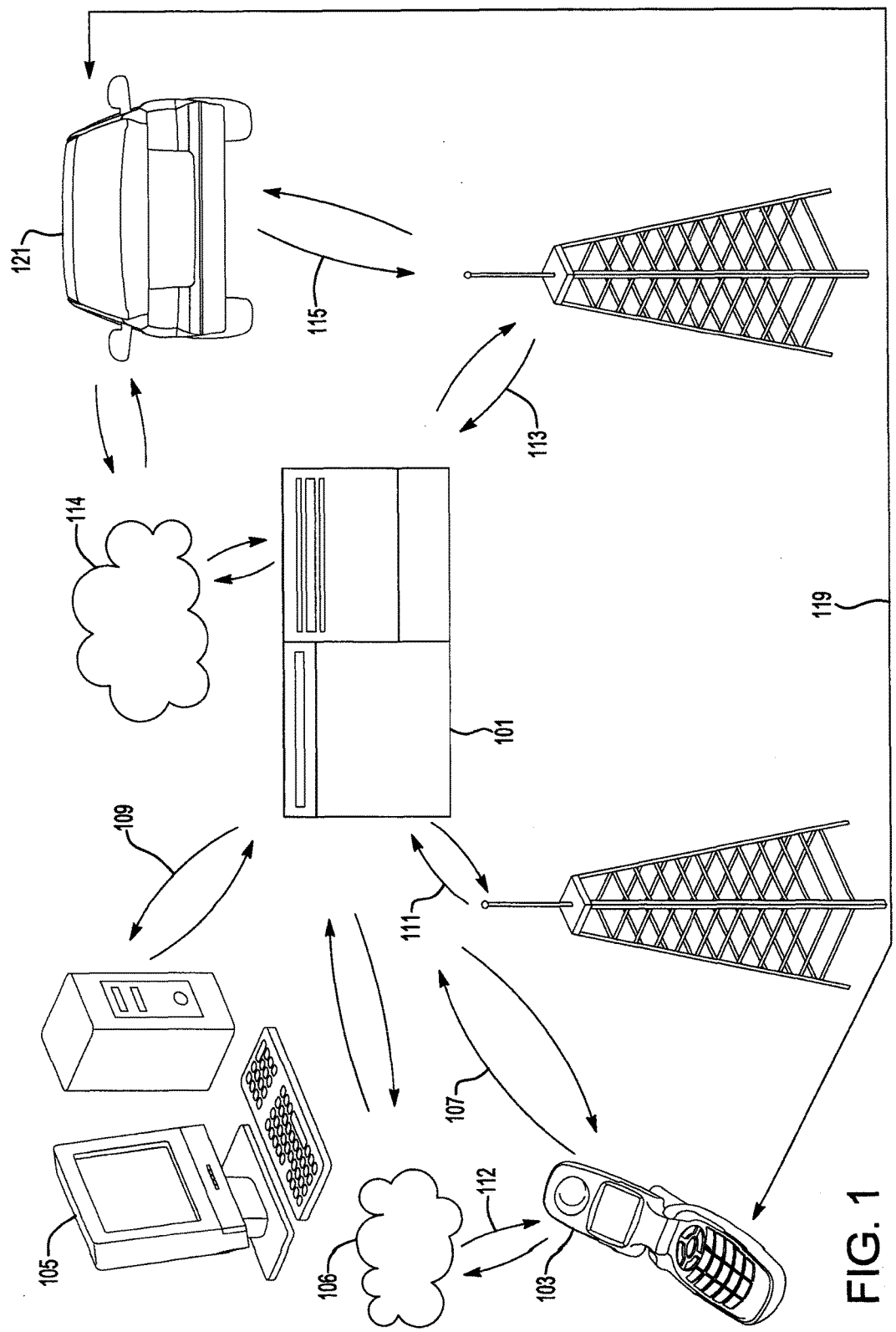
FIG. 1 shows an illustrative example of a communication system through which a nomadic device can communicate with a vehicle.

FIG. 1 shows an illustrative example of a communication system through which a nomadic device can communicate with a vehicle 121. In this illustrative embodiment, a nomadic device (e.g., without limitation, a cellular phone) 103 is used to send a communication through a cellular network 107. This communication is relayed through a network 111 (e.g., without limitation, the cellular network, the internet, etc.) to a centralized system 101. A system similar to the system shown in FIG. 1 is available from CRAYON INTERFACE, INC.

In this illustrative embodiment, the centralized system is a server system that includes processing capability for incoming nomadic device signals designated to interact with a remote vehicle 121.

For example, the server(s) 101 may include an automated call server and/or web host. Further, the server(s) 101 may route an incoming signal from a nomadic device (ND) 103 to the appropriate remote vehicle. Data sent in this fashion may be sent using data-over-voice, a data-plan, or in any other suitable format.

In another embodiment, the nomadic device 103 may send a communication through network 112 which may include, but is not limited to, Wi-Fi™ or Wi-Max®. This communication is relayed through a network 106 (e.g., without limitation, the internet) to a centralized system 101.

Data can also be sent to the remote vehicle 121 through the server(s) 101 using a personal computer 105. In this case, the data is likely, although not necessarily, sent over the internet 109.

Once the server(s) 101 receive the incoming data request from the remote source 103, 105, the message is processed and/or relayed to a vehicle 121. The vehicle may be identified by a header associated with one or more incoming data packets, or may be identifiable based on a database lookup, for example.

The relay to the vehicle 121 is sent out from the server(s) 101 through a network (e.g., without limitation, a cellular network 113, the internet, etc.) and passed through a cellular network 115 to the vehicle 121. In one embodiment, the relay may be passed through a broadband network 114 (e.g., 802.11g or Wi-Max®). A remote communication module 200 in the vehicle 121 receives the signal sent from the server(s) 101 and processes it or relays it to an appropriate processing system within the vehicle 121.

In at least one illustrative embodiment, the vehicle 121 is also outfitted with a communication transceiver, such as, but not limited to, a BLUETOOTH transceiver. This transceiver may allow communication with the nomadic device 103 using a direct signal 119 if, for example, cellular networks are unavailable.

FIGS. 2a-d show illustrative examples of vehicle-based communication modules that provide communication to a remote network.

Figure 2A:
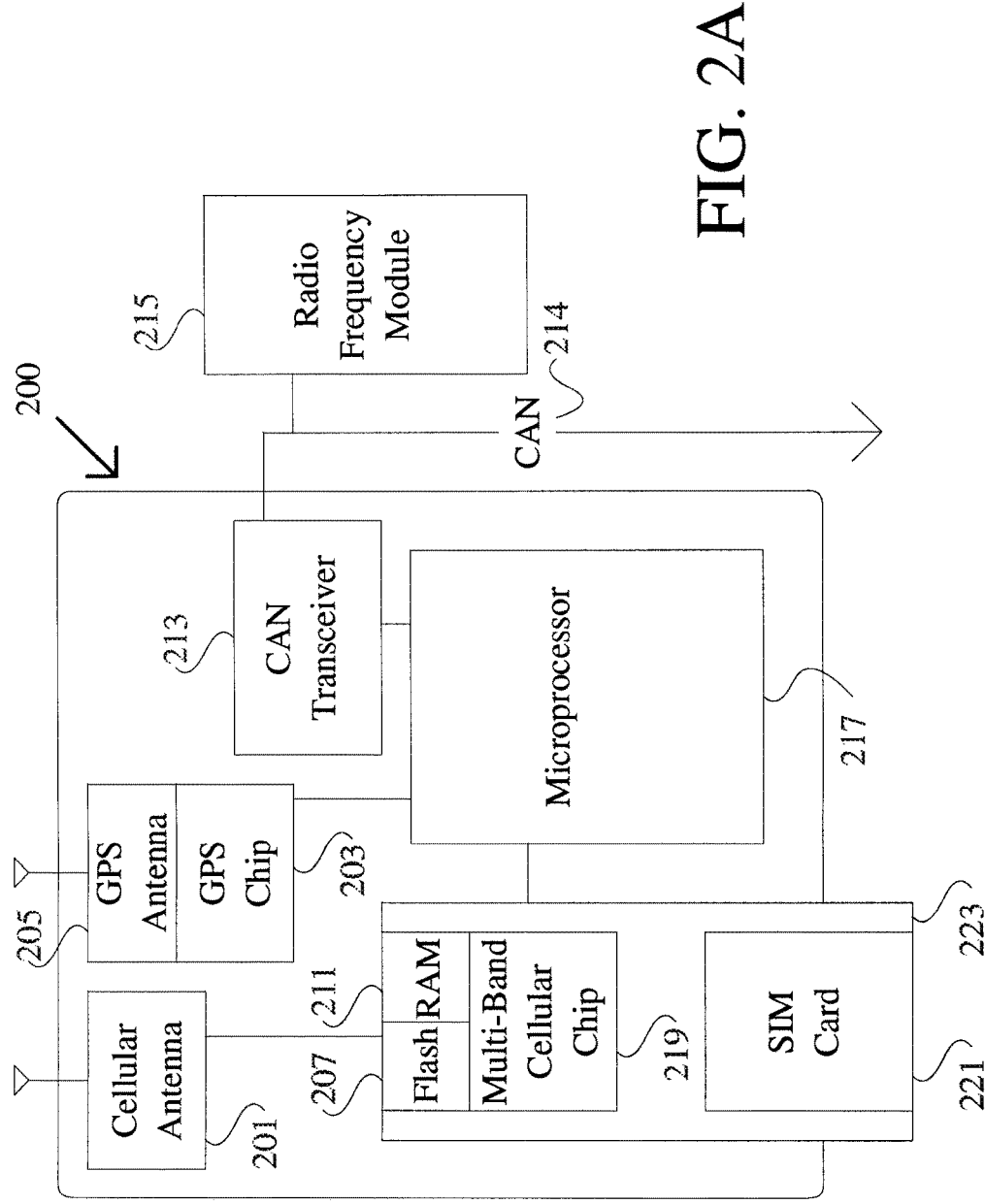
FIGS. 2a-d show illustrative examples of vehicle-based communication modules that provide communication to a remote network.

FIG. 2a shows an illustrative example of a communication module 200 combined with a GPS module, wherein a cellular module and GPS are on different boards.

In this illustrative embodiment, a communications module 200 can include a cellular (e.g., and without limitation, GSM or CDMA) antenna 201 that communicates with a remote server over a cellular network. The received cellular signal may be sent from the cellular antenna 201 to a multi-band cellular (e.g., and without limitation, GSM or CDMA) decoder 219 that processes the received signal to produce information usable by the microprocessor 217.

In this illustrative embodiment, the multi-band cellular chip 219, including flash memory 207 and RAM 211, is installed in the module as part of a removable device 223 including a SIM card 221. The SIM card 221 may contain user identifying information that allows access to the cellular network under a particular user's plan.

Additionally or alternatively, the module includes a GPS chip 203 that can process and decode a signal from the GPS antenna 205 and send this information to a microprocessor 217.

The microprocessor is also in communication with a vehicle data bus that provides access to various vehicle modules, such as RF module 215. Other modules not shown include, but are not limited to, the vehicle cluster, a remote (off-board) GPS system, a radio module, etc. Non-limiting examples of a vehicle data bus include an SAE J1850 bus, a CAN bus, a GMLAN bus, and any other vehicle data buses known in the art. For illustration purposes only, FIGS. 2a-2d are represented as using a CAN bus.

Figure 2B:
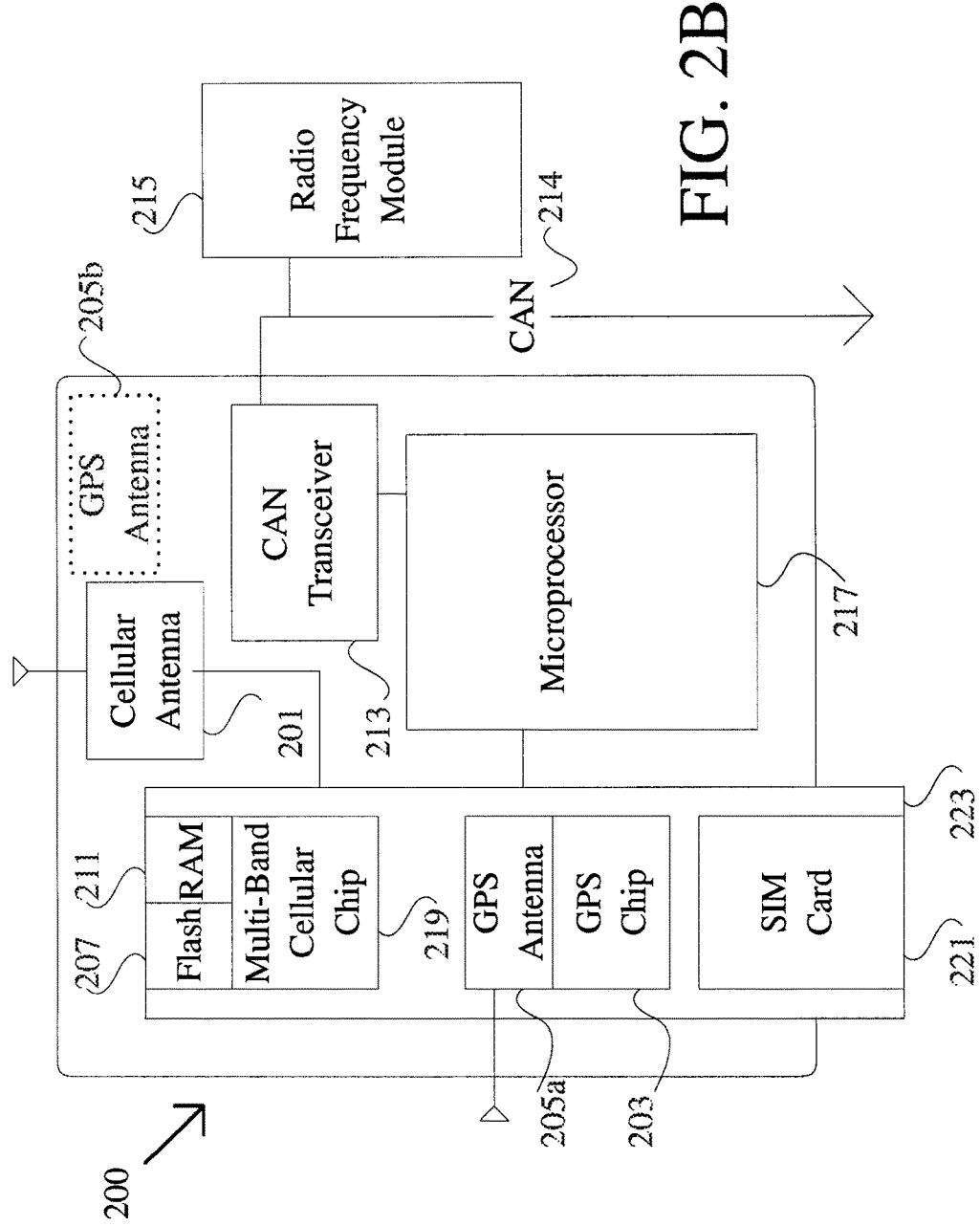

FIG. 2b shows a second exemplary embodiment in which a cellular chip and GPS are on the same board 223. In this illustrative embodiment, the removable board (this board may also be permanently attached to the module) 223 may contain the SIM card 221, a GPS module including a GPS chip 203 and a GPS antenna 205a, and the Multi-band cellular chip 219 including flash memory 207 and RAM 211.

In another embodiment, the GPS antenna 205b may be attached to the module separately from this board 223. When a signal comes in from the cellular antenna 201 and/or the GPS antenna 205b, the signal may be sent to the corresponding cellular/GPS chip 203 for processing, and then passed to the microprocessor 217. The microprocessor 217 interfaces with the CAN transceiver 213 to connect to a vehicle network 214 and vehicle modules such as RF module 215.

Figure 2C:
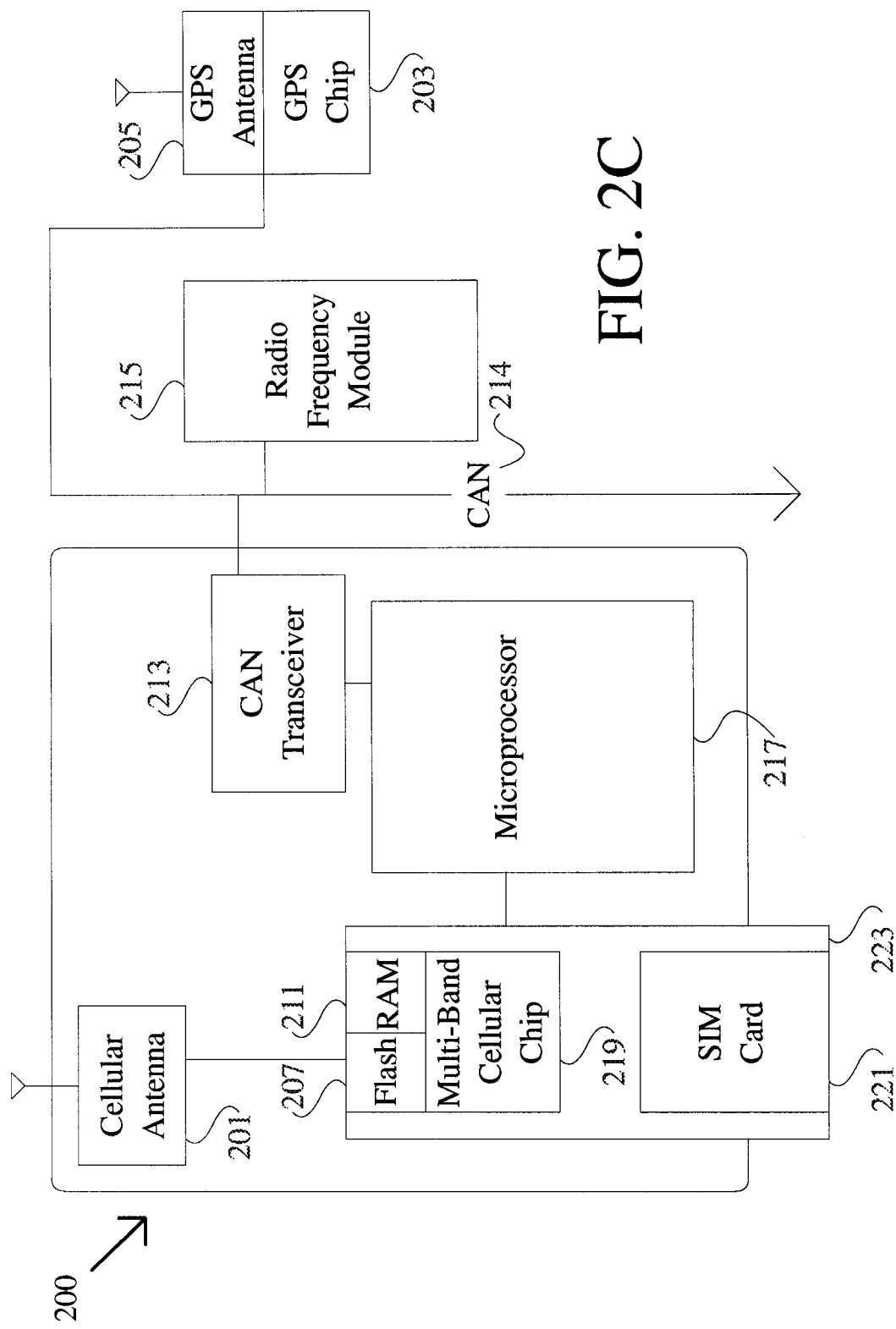

FIG. 2c shows yet another exemplary embodiment in which the cellular module is standalone. In this illustrative embodiment, the GPS module containing the GPS antenna 205 and the GPS chip 203 may connect to the microprocessor 217 through the CAN transceiver 213. Other vehicle modules, such as an RF module 215 can also connect to the microprocessor through the CAN transceiver 213.

In this illustrative embodiment, the removable board 223 may contain a SIM card 221 and a multi-band cellular chip 219, as well as a flash memory 207 and RAM 211. Signals from the cellular antenna 201 may be sent to the board 223 for processing by the multi-band cellular chip 219 before being sent to the microprocessor 217.

Figure 2D:
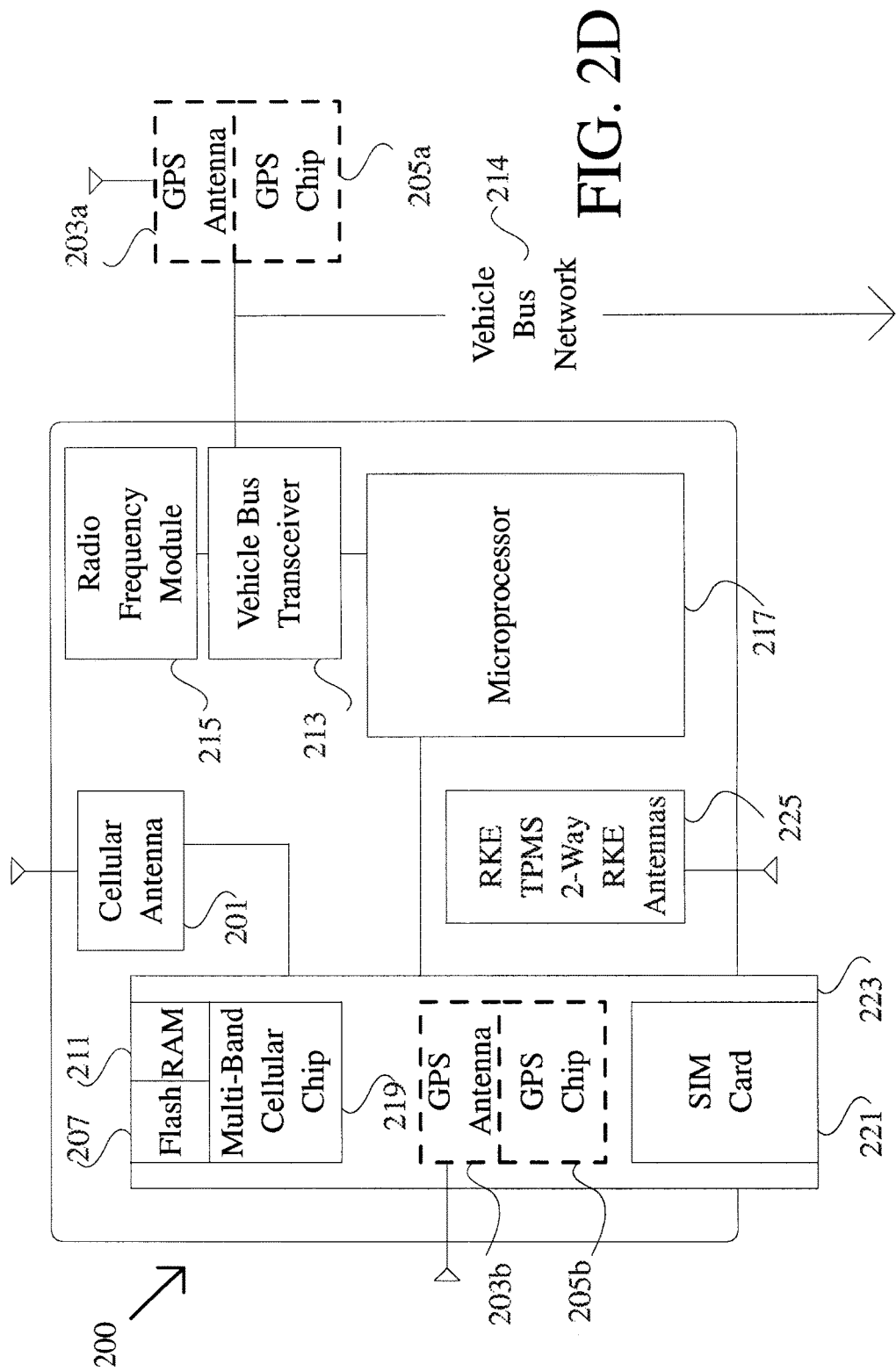

FIG. 2d shows still another exemplary embodiment in which a cellular module is combined with an RF module 215 in the communications module 200. The RF module 215 may continue to talk to the microprocessor 217 through the CAN transceiver 213. In this illustrative embodiment, the GPS module, including the GPS antenna 203a, 203b and GPS chip 205a, 205b can be located within the communications module 200 or located elsewhere in the vehicle, in which case it may communicate with the microprocessor 217 through the CAN transceiver 213.

Again, in this embodiment, the cellular antenna 201 may send a signal to the multi-band cellular 219, including flash memory 207 and RAM 211. The signal may be processed and sent to the microprocessor 217. The multi band cellular chip 219 may be located on a removable circuit board 223, which may also include a SIM card 221.

Figure 3:
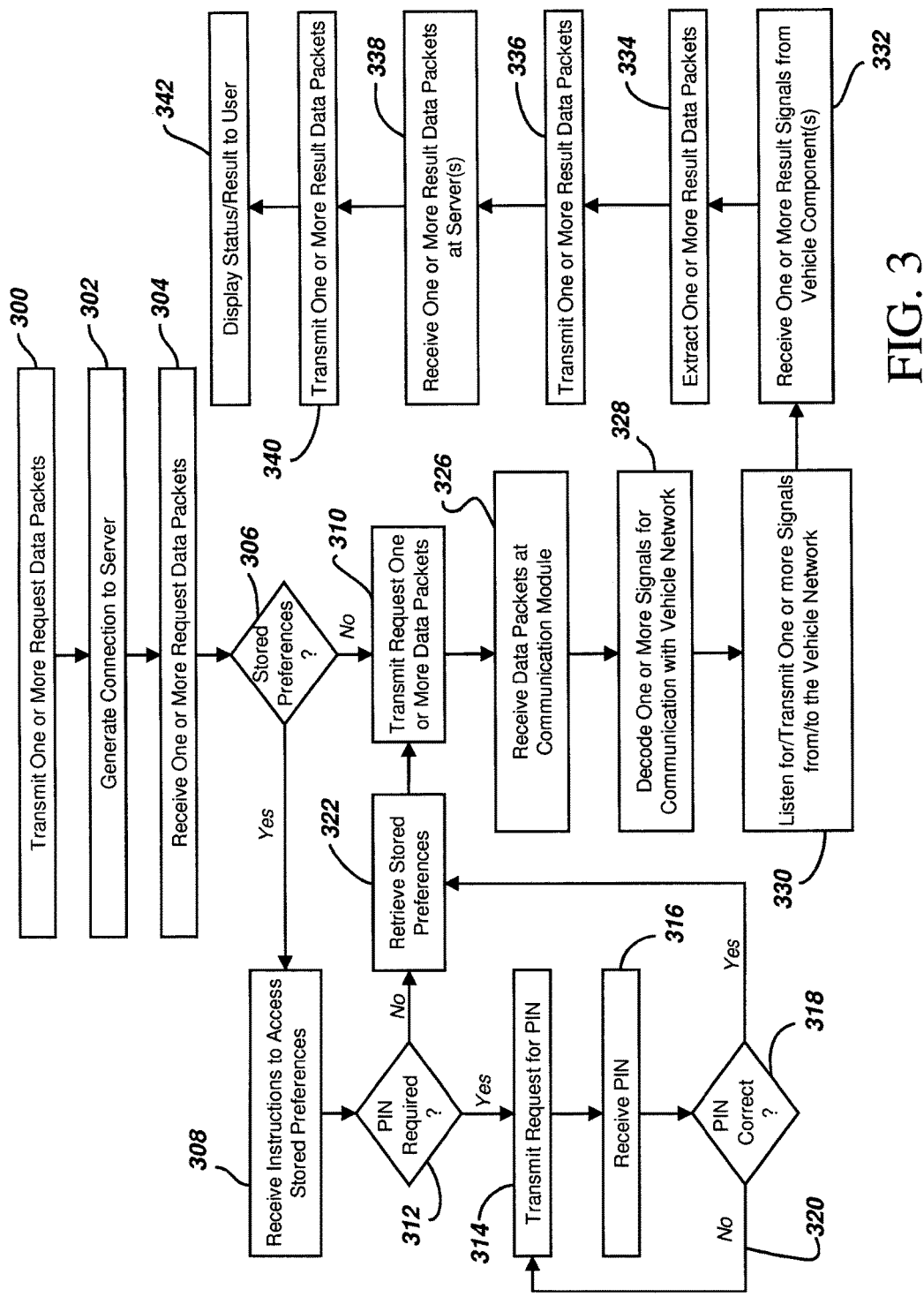
FIG. 3 shows an illustrative example of communication between a remote wireless device and a vehicle based wireless device.

FIG. 3 illustrates the operation of a communication module 200 according to one illustrative embodiment. The nomadic device (ND) 103 and/or computer 105 may include software for facilitating the operation of the one or more embodiments. The software may be downloaded to the ND 103 or computer 105 from a website (such as an OEM's website) or, as another example, come factory installed in the ND. In one embodiment, the software may be a programmed in the Java™ language.

In one or more exemplary embodiments, a user may control one vehicle with multiple NDs 103 or computers

105. Additionally or alternatively, the user may use one ND 103 or computer 105 to operate components of multiple vehicles.

The user may activate and operate the software using one or more button or key presses from his or her ND 103 and/or computer 105. In one illustrative embodiment, the ND 103 and/or computer 105 may be equipped with a hot-key from which the software may be activated. Alternatively or additionally, the user may activate and operate the software through a menu selection from a graphical user interface (GUI) displayed on the ND 103 and/or computer 105.

Further, computer readable storage mediums, including, but not limited to, hard disk drives, persistent and non-persistent memory, floppy disks, CDs, DvDs, flash drives, zip drives, etc. may contain instructions that facilitate one or more of the illustrative embodiments. The instructions are typically machine readable and executable by a processor on, for example, without limitation, the nomadic device, the server, and/or the vehicle based microprocessor.

Alternatively or additionally, the user may operate and activate the software through one or more voice-activated commands received by the ND 103 and/or computer 105. The ND 103 and/or computer 105 may include speech recognition software for interpreting and processing commands from a user into machine readable language. In one embodiment, the speech recognition software may be programmed and/or stored to the web server. Non-limiting examples of a user may be a vehicle owner, a vehicle passenger, a vehicle service technician, or a vehicle dealer.

Upon making the request (via, e.g., key button press or voice), one or more data packets may be transmitted from the ND 103 or computer 105 as illustrated in block 300. Non-limiting examples of data (i.e., information) transmitted in the data packets may include a mobile identification number (MIN), a customer identification number, the one or more commands triggered from the ND 103 and/or 105, and the vehicle identification number (VIN). Furthermore, in some embodiments, the one or more data packets transmitted from the ND 103 and/or computer 105 may include instructions for operating according to the one or more requests made by the user.

Referring back to FIG. 3, before or after the data packets are transmitted, a connection may be generated with the server(s) 101 as illustrated in block 302. The server(s) 101 may or may not be a web server. Once a connection to sever(s) 101 is made, the data packets may be received by the server(s) 101 as illustrated in block 304. Alternatively or additionally, a direct connection may be made between the ND 103 or computer 105 and the cellular communication module 200 (i.e., without making a connection to server(s) 101). Accordingly, the operation of one or more embodiments of the present invention may be accomplished without a server.

The server(s) 101 may process one or more received commands for transmission to the vehicle 121. Processing the data packet may include, but is not limited to, authenticating the one or more commands, authenticating the user (e.g., determining if the user is a registered user) and authenticating the cellular/mobile phone (e.g., matching the MIN to the VIN) transmitted in the data packet. In one non-limiting embodiment, the server(s) 101 may process the data packet using one or more look-up tables and validating the information in the data packets against the one or more tables.

The server(s) 101 may be in further communication with one or more databases (not shown). The data may be retrieved from third-party systems, OEM (e.g., vehicle) databases/servers or manually inputted by a user (e.g., an OEM).

In one exemplary embodiment, a determination may be made at the server(s) 101 if the user has any personal preferences as illustrated in block 306. While the preferences may be stored elsewhere, for purposes of illustration, FIG. 3 illustrates the operation based on the personal preferences being stored on the server(s) 101.

The personal preferences may be stored on the server(s) 101. Alternatively or additionally, the personal preferences may be stored in the ND's 103 or computer's 105 memory (not shown). In yet another embodiment, the personal preferences may be stored at the vehicle (e.g., on the SIM card 221, on the microprocessor 217 of the cellular communication module 200, or in a memory module present elsewhere in the vehicle). In this latter embodiment, the server(s) 101 may route the data packets to the vehicle without further processing.

Referring back to FIG. 3, if the user has personal preferences associated with one or more vehicle components, the server(s) 101 may receive instructions to access the stored preferences as illustrated in block 308. In one embodiment, the instructions may be transmitted with the one or more data packets received from the ND 103 and/or computer 105. The server(s) 101 may extract or read these instructions from the data packets to retrieve the stored personal preferences.

In one illustrative embodiment, a further determination may be made at server(s) 101 as to whether a personal identification number (PIN) is required to access the personal preferences or to operate one or more features of the software as illustrated in block 312. The PIN may be stored at server(s) 101 or may be transmitted with the data packets transmitted from the ND 103 and/or the computer 105. If a PIN is required, the server(s) 101 may transmit a request for the PIN as illustrated in block 314. The request may be transmitted to one or more memory locations (e.g., a database) on the server(s) 101 or to the remote terminals 103, 105. The PIN may be retrieved from the server(s) 101 using, for example, a look-up table based on information such as VIN, a customer number, a MIN, or other non-limiting identifiers. It should be understood that the PIN may be retrieved in any other means known in the art and the previous example is illustrative.

For example, it may be desirable to "PIN restrict" only certain features. A tracking feature, for example, may be PIN restricted, since it would allow a person who found a cellular phone to also find the vehicle, and possibly gain entry, depending on the features available on the phone. Accordingly, the tracking feature may require a PIN entry to activate.

In one illustrative embodiment, once a PIN has been entered once, it may not need to be re-entered until the phone has been deactivated and reactivated.

The server(s) 101 may receive the PIN as illustrated in block 316. The PIN may then be validated as illustrated in block 318. If the PIN is not correct, the server(s) 101 may re-transmit the request as represented by loop 320. In one embodiment, a user may reenter a PIN a predetermined number of times (e.g., 3 or 5 times) after entering an incorrect PIN. If the PIN is correct, the server(s) 101 may retrieve the personal preferences associated with the request, as illustrated in block 322, and transmit the one or more data packets with the stored preferences to the cellular communication module as illustrated in block 310.

If a PIN is not required to access the personal preferences or if there are no stored preferences, upon receiving the one or more data packets, the server(s) 101 may transmit the one or more data packets to the cellular communication module as represented in block 310. The one or more data packets may be transmitted over the network (e.g., cellular network 113 or the internet). The cellular communication module 200 may then receive (e.g., via GSM antenna 201) the one or more data packets over the network as represented in block 326. One or more signals for transmission to the vehicle CAN network 214 may then be generated (e.g., by the multi-band GSM decoder 219) as represented in block 328.

In one embodiment, the one or more signals may be decoded and translated for transmission to the CAN interface (e.g., CAN transceiver 213 and vehicle network 214) at the microprocessor 217 which may be in communication with the GSM decoder 219 via electrical communication. (Other vehicle system busses different from the CAN bus may also be communicated with/though) The one or more signals may be decoded for interpretation by the vehicle network 214. The one or more signals (including the data packets) may then be transmitted to the CAN interface (e.g., the CAN transceiver 213) as represented in block 330.

The CAN transceiver 213, upon receiving the one or more request signals, may transmit the one or more request signals to the one or more vehicle components via vehicle network 214.

After one or more operation have been completed based on the request/command by the user, the CAN transceiver 213 may receive the one or more result signals transmitted from the one or more vehicle components as illustrated in block 332. The CAN transceiver 213 may transmit the one or more return signals to the microprocessor 217 for extracting one or more return data packets for transmission to the ND 103 and/or 105 as in block 334. Transmission may be accomplished by the GSM antenna 201 over network 115.

Upon transmitting the one or more result data packets, as illustrated in block 336, the data packets may be transmitted to the remote terminals 103 and/or 105. In one embodiment, the return data packets may be routed through server(s) 101, as illustrated in block 338, which may or may not further process the data packets for transmission to the remote terminals 103 and/or 105. The result data packet(s) may be transmitted to (as illustrated in block 340) and received by the ND 103 and/or computer 105.

A report may be generated and displayed to the user as illustrated in block 342. The report may be generated each time the user requests one or more operations. Alternatively or additionally, the report may be generated at predetermined time intervals or according to a user preference (e.g., on a monthly basis or each time the user specifically requests a report).

In at least one illustrative embodiment, communication between a vehicle based cellular chip and a remote wireless device is possible. This communication can be used, among other things, to send GPS coordinates of a vehicle to the wireless device. The GPS coordinates can be transmitted to a wireless transceiver over a vehicle system bus or through another connection (for example, RF or BLUETOOTH, if the GPS is not connected to a vehicle system bus).

Figure 4:
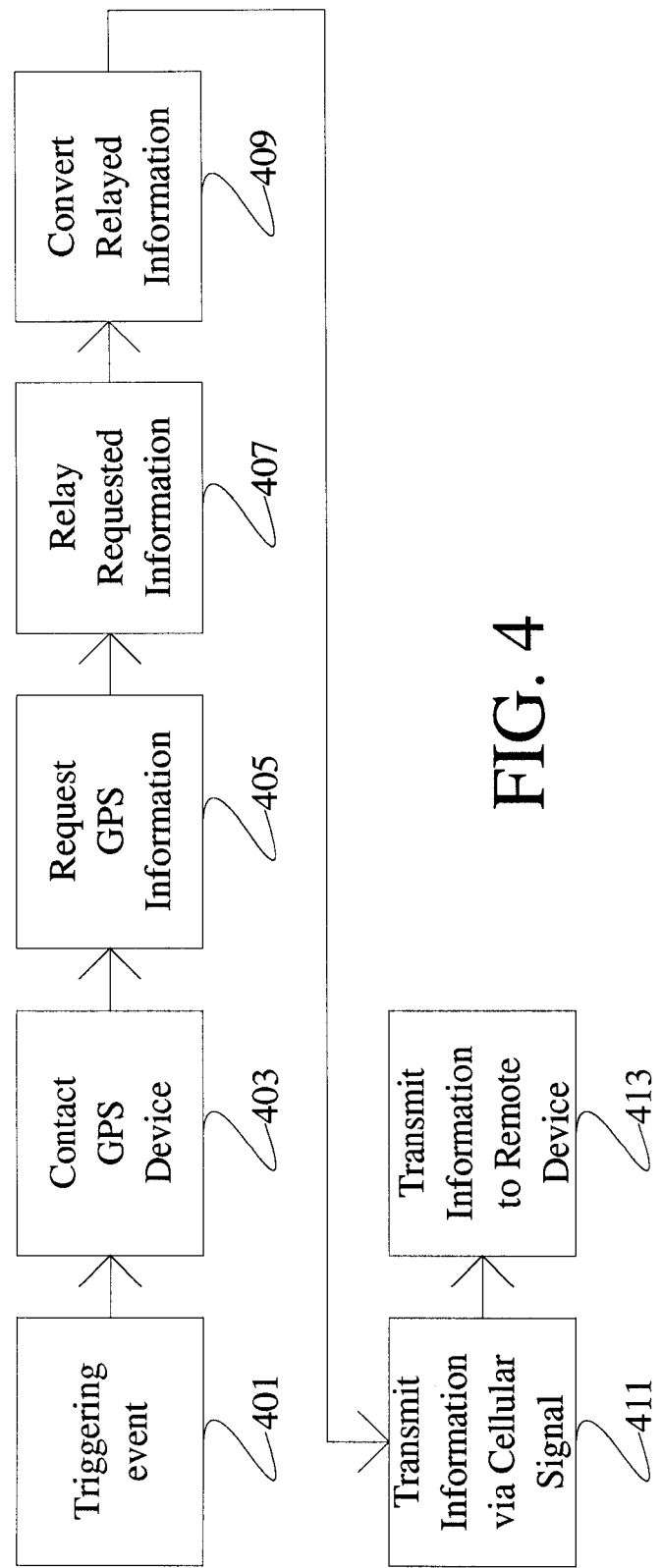
FIG. 4 shows an illustrative example of a process for tracking a vehicle using a remote device.
Figure 5:
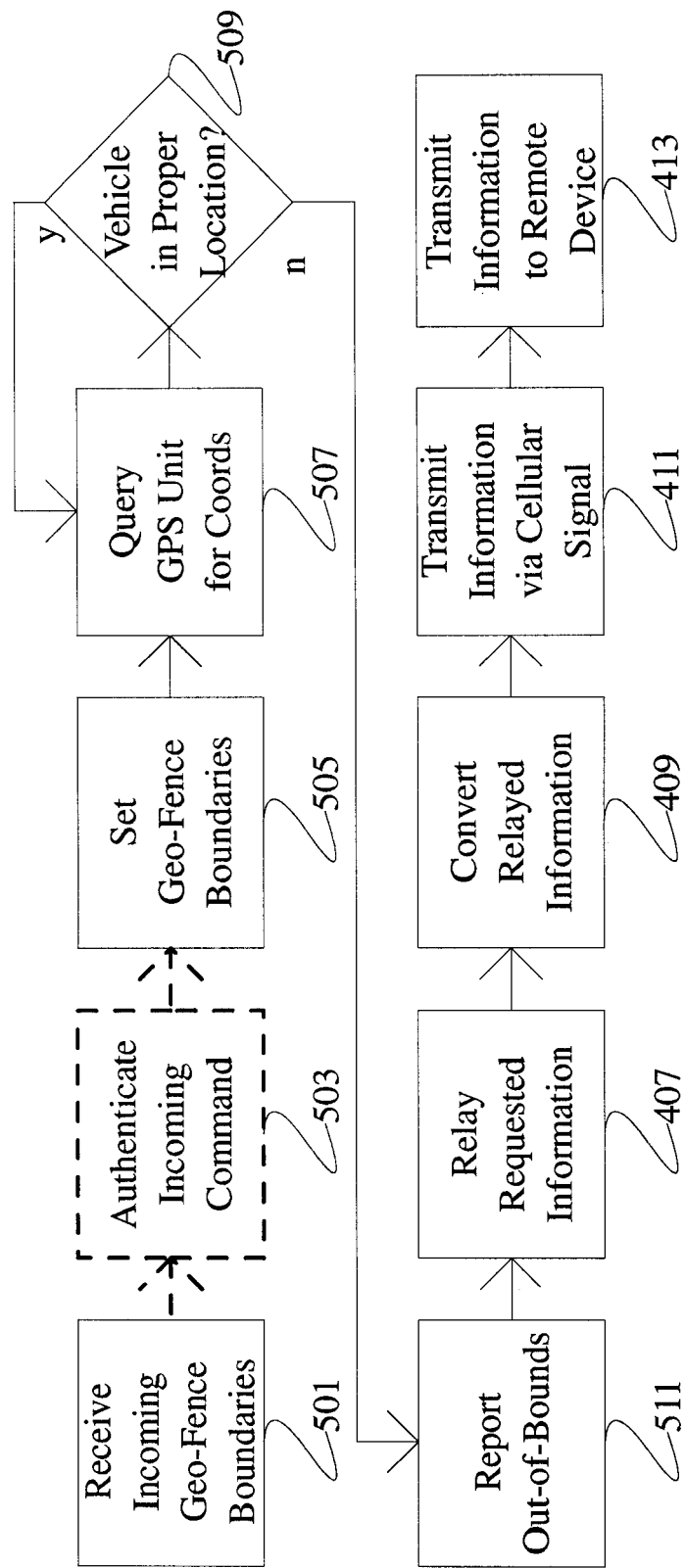
FIG. 5 shows an illustrative example of a geo-fence setting/detection process.
Figure 6:
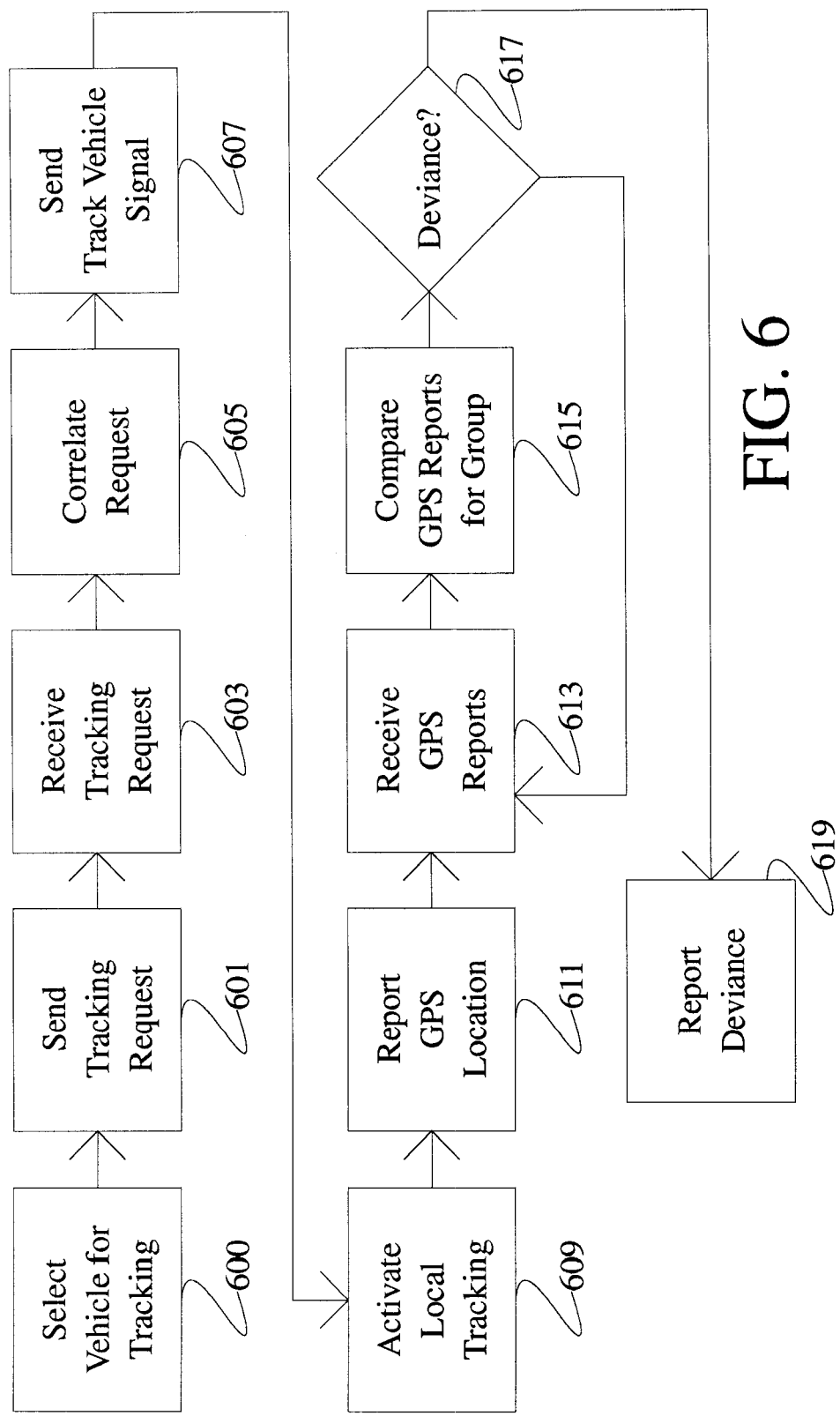
FIG. 6 shows an illustrative example of a vehicle shipment tracking process.

In this illustrative embodiment, one example of which is shown in FIG. 4, a triggering event 401 occurs that causes a call to the GPS system 403. In this embodiment, the GPS system is an onboard system, although a standalone GPS could also be used. The GPS device is contacted and, in one illustrative embodiment, present GPS location information is requested 405.

The requested information is then relayed 407 to, for example, a microprocessor in communication with an onboard cellular chip and to a multi-band GSM included with the chip. The information is also converted into a format suitable for cellular communication 409. This conversion can be done, for example, by the microprocessor, or, for example, it can be done by a multi-band GSM (conversion may occur before the relay is completed). The converted information is then sent to a remote PC 411 through a cellular connection provided by the cellular chip (which is embedded or otherwise included in the vehicle), where it is then passed along to a requesting cellular phone or other device (with or without additional conversion). Once the information has reached the requesting device, it can be displayed in a convenient format including, but not limited to: coordinates, closest crossroads to the vehicle, map showing vehicle location, etc.

In another illustrative embodiment, a string of vehicle location history information can be stored in, for example, a memory located in the vehicle. For example, a tracking system can be configured to store a series of vehicle location data points on demand, each time a vehicle is driven, etc. A query to the vehicle made from a remote cellular phone or other device can be sent to the HDD via a vehicle data bus and the string of locations can be received. In response to the request, the data may be sent to the remote device, through, for example, an intermediary PC network, and the recent or long-term history of vehicle locations may be received. If the data is stored in a simple format (such as text), a massive vehicle driving history can be kept in a relatively limited amount of memory. Such information could be useful, for example, in a fleet management system, where a manager may wish to know where a vehicle has been driven in the past month (week, year, etc.).

In yet a further illustrative embodiment, a virtual geo-fence may be implemented. In this embodiment, a user can use a remote device, such as a cellular phone with a graphic/text menu, to set boundaries for a geo-fence. This can be done, for example, by selecting points on a visual map, defining cross roads comprising corners of the fence, etc. The remote data points are transmitted to an intermediary PC, where authentication of the geo-fence command and location of the corresponding vehicle may be performed.

In this illustrative embodiment, the boundaries of the geo-fence are received by a cellular chip included with the vehicle 501. Some onboard authentication of the received instructions may or may not also be performed 503. After the information is received (and authenticated if desired), geo-fence boundaries may be set 505. A microprocessor, for example, may then repeatedly query a GPS unit to track present coordinates 507. In an alternative embodiment, boundaries could be set to an HDD and compared against coordinates that are being repeatedly stored in the HDD. In either case, when no boundary has been crossed 509, the query/comparison continues.

If a boundary is crossed, however, then an out-of-bounds (or similar) report is sent for transmission to a remote device 511. As with FIG. 4, the requested information (this time an out-of-bounds signal and/or coordinates, etc.) is relayed and converted 407, 409, and then transmitted to a remote network PC 411, where it is matched with a requesting device and transmitted to the requesting device 413.

These fences can be used in several manners. They can define, for example, an area within which a vehicle should stay. If the vehicle strays from the defined area, then a warning can be sent. This could be useful for monitoring an employee or a child driving a car. Alternatively, for example, this could be useful if valet parking a car. In that instance, an automatic fence of, for example, a fixed number of blocks around the location at which the car was dropped off could be set. An owner could be notified immediately if the car leaves the area.

Alternatively, these fences could block-off areas into which a vehicle should not travel. For example, a parent could give a child a car but instruct them not to go into certain neighborhoods. If the car enters any one of a pre-defined neighborhood, a warning could be sent to the parent.

These fences could also be preset to night/day conditions, such that they are only activated during certain times. Appropriate times could be determined by, for example, a clock in communication with a microprocessor charged with tracking the fences, or, in another embodiment, could be triggered by a light sensor included in the vehicle and tied into a vehicle system bus (and thus able to transmit a signal to a microprocessor). Such timing could be activated by use of a remote device (for example, a parent may not need a notification if they are driving the vehicle, but if a child is driving the vehicle the parent may wish to remotely activate night-time fencing to ensure the child remains in prescribed locations).

These are just a few of the many uses of such a vehicle fencing system. Since the fence can be dynamically changed via the remote device, as well as activated/deactivated, even if the person setting the fence forgot to set the fence in advance, the fencing can be set or activated at any time, without actually needing to be present in the vehicle.

Another use for this fence could be a dealer test drive. A busy salesperson could easily give someone the keys to test drive a car, and then, while walking to talk to another customer, set the appropriate geo-fence (or activate a preset one) without having to leave the lot and interact with a land-line or other PC network. In addition to theft prevention/deterrence, this also allows the sales person to be notified if the vehicle leaves the area, and can lead to an improved customer experience.

For example, the sales person could notice that the vehicle had left the predefined area and call the customer to see if the customer was lost or in trouble. Then the sales person could take the appropriate steps. A customer helped in such a fashion might be more inclined to trust such a sales person.

Also, the sales person could use an advanced phone with a map display to show a recommended route to a customer, while standing at the vehicle, and then at the same time set a geo-fence around that route. Such a sales person could then assure the customer that, even if they got lost while on the route, the sales person could easily notice the error and call them to correct it. This may even facilitate the customer giving a phone number to the sales person.

Similar geo-fences may be used in lot monitoring. For example, a plant manager could have vehicles in a lot broadcasting location. This could help prevent new vehicle theft while the vehicles are awaiting transport, as well as helping in inventory management, vehicle counts, etc. A preset signal may be sent from an unsold vehicle up until the time of purchase as well, allowing constant tracking of all vehicles until a purchaser drives them off a lot and the preset signal is deactivated. Using such a system in conjunction with one or more remote devices allows tracking and activation/deactivation of the signal at any time.

Exemplary geo-fences may be defined, for example, by a radius from a starting point. For example, when the fence is set, the limits of the fence could be 10 miles in any direction from the starting point where the fence was set. Alternatively, the fences could be defined by a series of city, state, county boundaries. Or the fence could be defined by intersections forming the corners of an X sided object.

Determinations that a vehicle has left a fenced area could be made by a central server or by the vehicle itself. For example, the vehicle could receive coordinates from a GPS system and compare the coordinates to the fenced area. Or the vehicle could transmit the coordinates to a central server for comparison.

In another illustrative embodiment, a shipment of vehicles can be tracked as a unit while en-route. In this illustrative embodiment, a plurality of vehicles can be remotely activated for tracking as they are being loaded onto a carrier for transport (as one example). A vehicle can be selected for tracking 600, and the signal to activate each vehicle for tracking can be sent to 601 and received by 603 a remote PC. The signal can then be correlated with a specific vehicle for which the request was made (and the vehicle can be added to a tracking list) 605. The signal can then be relayed to an onboard cellular chip 607 (and authenticated if needed). In this manner, a single remote device can track entire shipments of vehicles, as well as tracking multiple shipments of vehicles.

Once the activation signal is sent from the remote PC, the signal is received by an individual vehicle and that vehicle can activate a reporting system 609. The reporting system will repeatedly query a vehicle GPS and report back a GPS location 611 until, for example, a predefined location has been reached. As long as the location has not been reached, the signal may be reported (with conversions as necessary).

A remote PC or the remote device itself can be running a program that recognizes that a group of signals is being tracked together. This may prevent the signals from having to be constantly relayed back to the remote device user and displayed. The device running the tracking program will receive a plurality of signals 613. Because a driver may take unexpected detours, due to, for example, construction, etc., it may not be desirable to always relay a change in course. Instead, in this embodiment, the present location of each of the plurality of vehicles in a shipment is compared 615. As long as the vehicles remain within, for example, a predefined distance of each other without significant deviance 617, the system can be relatively confident that all the vehicles remain on the carrier. Thus, it can be determined that the vehicles have remained as a pack.

If one or more vehicle coordinates significantly diverge from the other vehicles, however, there is a good chance that that vehicle has been improperly removed from the carrier. Accordingly, an alarm can be sent 619 and appropriate action (tracking, notification to authorities, etc. can be taken).

Such a system can also be used in conjunction with a geo-fence to ensure the entire shipment does not stray too far afield, such as if all vehicles leave a predetermined area.

In yet another illustrative embodiment, GPS tracking can be used to determine, for example, a towing instance. If the GPS coordinates of the vehicle change and the vehicle has not been started, then it's likely the vehicle is being towed, and an owner can be alerted. If the customer is notified of the vehicle movement and it is unlikely that a tow event has occurred, the customer could be given the option to notify 911 via the vehicle system as well, and the GPS coordinates of the vehicle could be tracked.

What is claimed:

1. A computer-implemented method comprising: selecting a vehicle for tracking using a mobile device;
   defining, using the mobile device, a geo-fence including a vehicle-sensor detectable light condition under which the geo-fence is active;
   transmitting a tracking request to the vehicle, including the geo-fence;
   receiving a message transmitted to the mobile device from the vehicle, indicating the vehicle has traveled outside the geo-fence; and
   displaying an alert on the mobile device, responsive to the message.

2. The method of claim 1, further including, transmitting the tracking request to the vehicle through an intermediary server; and authenticating the tracking request by receiving a PIN embedded in a received packet and comparing the PIN to a PIN associated with the vehicle.

3. A non-transitory computer readable storage medium storing a plurality of instructions executable by a microprocessor, wherein execution of the instructions by the microprocessor causes the microprocessor to perform the steps comprising:
   selecting a vehicle for tracking using a mobile device;
   defining a geo-fence using the mobile device, including a light condition, detectable by a vehicle sensor, for geo-fence activation;
   transmitting a tracking request to each vehicle, including the geo-fence and light condition;
   receiving a message at the mobile device, from the vehicle, indicating the vehicle has traveled outside the geo-fence; and
   displaying an alert on the mobile device, responsive to the message.

4. The computer readable storage medium of claim 3, the method further including, transmitting the tracking request to the vehicle through an intermediary server; and authenticating the tracking request by receiving a PIN embedded in a received packet and comparing the PIN to a PIN associated with the vehicle.

5. A system comprising:
   a server processor programmed to:
      receive vehicle selection, geo-fence coordinates, and a vehicle light sensor condition detection for geo-fence activation, upon a vehicle sensor detecting the sensor setting detection condition, from a portable wireless device on which the geo-fence coordinates, vehicle selection and light sensor condition were defined;
      transmit tracking instructions to the selected vehicle, including the geo-fence coordinates and the light sensor condition;
      receive a message from the vehicle indicating that the vehicle has traveled outside the geo-fence coordinates; and
      relay the message to the wireless device from which the selection and geo-fence originated.

6. The system of claim 5, wherein the at least one remote portable wireless device is a cellular phone.

7. The system of claim 5, wherein the processor is further programmed to authenticate a packet transmitted by the remote portable wireless device to determine if the remote portable wireless device is permitted to track a selected vehicle.

8. The system of claim 7, wherein the authentication consists at least in part of receiving a PIN entered into the remote portable wireless device and comparing the PIN to a PIN associated with the selected vehicle.

* * * * *